United States Patent
Lin et al.

(10) Patent No.: US 12,159,115 B2
(45) Date of Patent: Dec. 3, 2024

(54) GENERATING MODEL TRAINING DATA FROM A DOMAIN SPECIFICATION

(71) Applicant: Microsoft Technology Licensing, LLC, Redmond, WA (US)

(72) Inventors: Zeqi Lin, Beijing (CN); Yu Hu, Redmond, WA (US); Haiyuan Cao, Bellevue, WA (US); Yi Liu, Woodinville, WA (US); Jian-Guang Lou, Beijing (CN); Kuralmani Elango, Bothell, WA (US); PalaniRaj Kaliyaperumal, Redmond, WA (US); Weizhu Chen, Kirkland, WA (US); Kunal Mukerjee, Redmond, WA (US)

(73) Assignee: Microsoft Technology Licensing, LLC., Redmond, WA (US)

(*) Notice: Subject to any disclaimer, the term of this patent is extended or adjusted under 35 U.S.C. 154(b) by 338 days.

(21) Appl. No.: 17/505,531

(22) Filed: Oct. 19, 2021

(65) Prior Publication Data

US 2023/0119613 A1 Apr. 20, 2023

(51) Int. Cl.
*G06F 40/35* (2020.01)
*G06F 40/186* (2020.01)
(Continued)

(52) U.S. Cl.
CPC ............ *G06F 40/35* (2020.01); *G06F 40/186* (2020.01); *G06F 40/211* (2020.01); *G06N 20/00* (2019.01)

(58) Field of Classification Search
USPC .............................................. 704/7–10, 257
See application file for complete search history.

(56) References Cited

U.S. PATENT DOCUMENTS 8,027,945 B1 9/2011 Elad et al.
9,703,844 B2 7/2017 Campbell et al.
(Continued)

FOREIGN PATENT DOCUMENTS

KR 101987915 B1 6/2019

OTHER PUBLICATIONS

Cunningham, Ryan, "Introducing Power Apps Ideas: AI-Powered Assistance now Helps Anyone Create Apps using Natural Language", Retrieved From: https://powerapps.microsoft.com/en-us/blog/introducing-power-apps-ideas-ai-powered-assistance-now-helps-anyone-create-apps-using-natural-language/, May 25, 2021, 9 Pages.
(Continued)

*Primary Examiner* — Leonard Saint-Cyr
(74) *Attorney, Agent, or Firm* — Barta Jones, PLLC

(57) ABSTRACT

Examples described herein generate training data for machine learning (ML) for natural language (NL) processing (such as semantic parsing for translating NL). A formula tree is generated based on sampling both a formula grammar and NL templates. Using the formula tree, an ML training data instance pair is generated comprising a formula example and an NL example. A context example may also be used during instantiation of the formula tree. An ML model is trained with training data including the ML training data instance pair, and ML output is generated from NL input. The ML output includes, for example, a machine-interpretable formula, a database querying language command, or a general programming language instruction. Some examples support context-free grammar, probabilistic context-free grammar, and/or non-context-free production rules.

20 Claims, 8 Drawing Sheets

(51) Int. Cl.
*G06F 40/211* (2020.01)
*G06N 20/00* (2019.01)

(56) References Cited

U.S. PATENT DOCUMENTS

| | | | |
|---|---|---|---|
| 9,830,315 B1 | 11/2017 | Xiao et al. | |
| 11,775,772 B2* | 10/2023 | Galitsky | G06F 40/253 |
| | | | 704/9 |
| 2017/0061324 A1* | 3/2017 | Glass | G06N 5/046 |
| 2019/0121847 A1* | 4/2019 | Castañeda-Villagrán | |
| | | | G06N 20/00 |
| 2021/0103703 A1* | 4/2021 | Galitsky | G06N 5/04 |
| 2021/0117625 A1 | 4/2021 | Gao et al. | |
| 2021/0174030 A1* | 6/2021 | Galitsky | G06F 40/253 |

OTHER PUBLICATIONS

Cussens, James, "Loglinear Models for First-Order Probabilistic Reasoning", In Proceedings of the Fifteenth Conference on Uncertainty in Artificial Intelligence, Jul. 30, 1999, pp. 126-133.

Lindhorst, Greg, "What is Microsoft Power Fx?", Retrieved From: https://powerapps.microsoft.com/en-us/blog/what-is-microsoft-power-fx/, Mar. 2, 2021, 17 Pages.

Liu, Norah, "Writing Power Fx Formulas with Natural Language", Retrieved From: https://powerapps.microsoft.com/en-us/blog/writing-power-fx-formulas-with-natural-language/, Aug. 23, 2021, 7 Pages.

Wachtel, et al., "Initial Implementation of Natural Language Turn-Based Dialog System", In Journal of Procedia Computer Science, vol. 84, Dec. 2016, pp. 49-56.

Hartmann, et al., "Generating a Large Dataset for Neural Question Answering over the DBpedia Knowledge Baseledge Base", Retrieved From: https://www.researchgate.net/profile/Edgard-Marx-2, Apr. 2018, 9 Pages.

Iyer, et al., "Learning a Neural Semantic Parser from User Feedback", In Repository of arXiv:1704.08760v1, Apr. 27, 2017, 11 Pages.

Kamath, et al., "A Survey on Semantic Parsing", In Repository of arXiv:1812.00978v3, May 29, 2019, 22 Pages.

"International Search Report and Written Opinion Issued in PCT Application No. PCT/US22/040981", Mailed Date: Nov. 21, 2022, 11 Pages.

Weir, et al., "Dbpal: A Fully Pluggable nl2sql Training Pipeline", In Proceedings of the ACM SIGMOD International Conference on Management of Data, Jun. 14, 2020, pp. 2347-2361.

* cited by examiner

FIG. 2
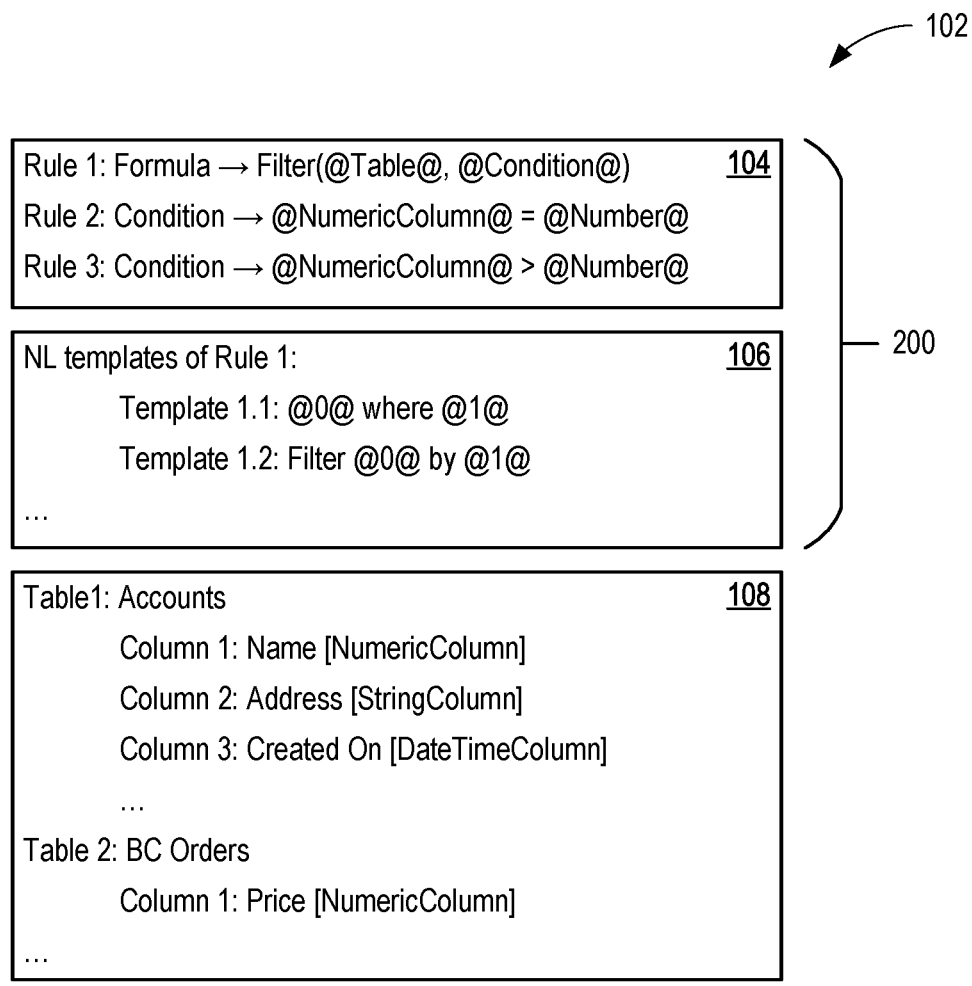
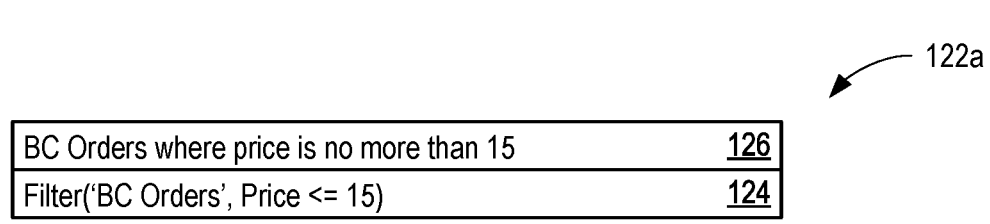

GENERATING MODEL TRAINING DATA FROM A DOMAIN SPECIFICATION

BACKGROUND

Formula languages are used in applications such as Excel, Power Apps, and LaTeX to permit users to write formulas, perform calculations, or manipulate applications. However, this typically requires that the user have a certain level of expertise in the application-specific formula language. To lower the learning curves and improve end-user experience, semantic parsing systems are often used, which convert natural language (NL) received from the user into machine-interpretable representations.

Semantic parsing systems are typically based on end-to-end machine learning (ML) solutions (or artificial intelligence, AI, used interchangeably herein), leading to huge demands on the amount of training data in the form of NL utterances paired with their corresponding meaning representation (MR) or machine-interpretable representation. Collecting and labeling (e.g., annotating) such training data is time-consuming and expensive, presenting a major obstacle for improving the quality of the ML solutions.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Solutions for machine learning (ML) for natural language (NL) processing, for example semantic parsing for translating NL, include receiving a formula grammar and NL templates. A formula tree is generated at least by sampling the formula grammar and sampling the NL templates. Using the formula tree, an ML training data instance pair is generated. The ML training data instance pair comprises a formula example and an NL example.

BRIEF DESCRIPTION OF THE DRAWINGS

The disclosed examples are described in detail below with reference to the accompanying drawing figures listed below:

FIG. 2 illustrates various inputs and outputs of the arrangement of FIG. 1;

Corresponding reference characters indicate corresponding parts throughout the drawings.

DETAILED DESCRIPTION

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Aspects of the solutions generate training data for machine learning (ML) models. The ML models are used in, for example, semantic parsing systems for translating natural language (NL). A formula tree is generated at least by sampling the formula grammar and sampling the NL templates. An ML training data instance pair is generated using the formula tree. The ML training data instance pair comprises a formula example and an NL example. Some examples include instantiating the formula tree using sampling of context examples. Some examples include training an ML model with the training data and generating ML output using NL input. In some examples, the ML output comprises a machine-interpretable formula, a database querying language command (e.g., structured query language (SQL)), or a general programming language instruction (e.g., R or Python). Some examples support context-free grammar, probabilistic context-free grammar, or non-context-free production rules.

Aspects of the disclosure improve the operations of computing devices at least by improving the efficiency of training ML models that perform semantic parsing to translate NL utterances. Aspects of the disclosure operate in an unconventional manner at least by sampling formula grammar and NL templates to generate a formula tree, and using the formula tree to generate an ML training data instance pair. This synthesizing of training data facilitates rapid, computing resource efficient production of large amounts of high-quality training data that spans a wide variation of NL usage. Additionally, the generation of synthetic training data advantageously precludes privacy and permission issues that may arise with training data that uses utterances collected from live humans. In this manner, the examples described herein improve privacy and data protection.

Figure 1:
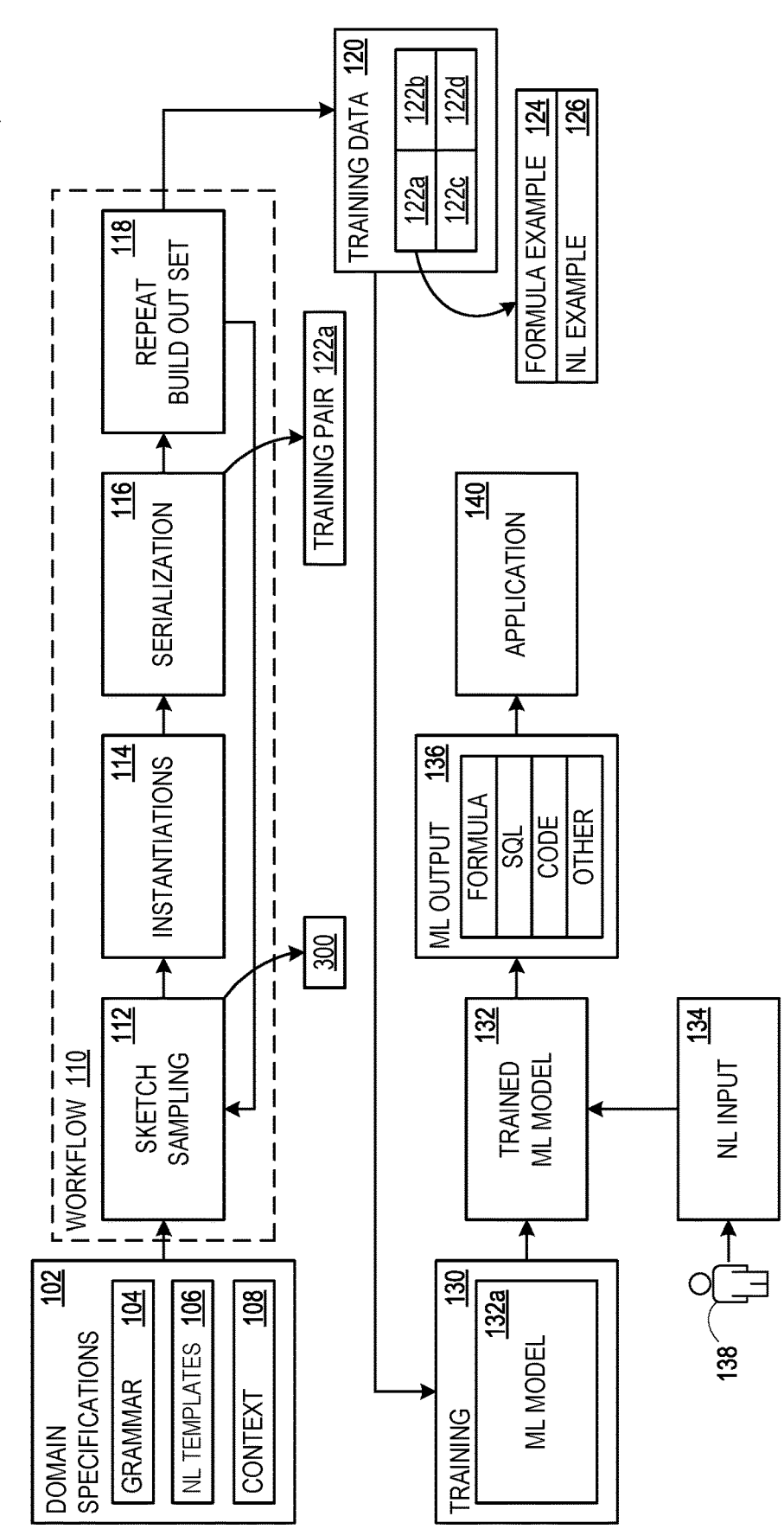
FIG. 1 illustrates an example arrangement for advantageously employing machine learning (ML) for natural language (NL) processing; for example, semantic parsing for translating NL.

FIG. 1 illustrates an example arrangement 100 that advantageously produces large amounts of high-quality ML training data 120. Training data 120 may then be used to train an ML model 132a into trained ML model 132 that performs NL processing, such as semantic parsing for translating an NL input 134. In operation, a set of domain specifications 102, which includes formula grammar 104, NL templates 106, and sampling context examples 108, is provided to a workflow 110 that produces training data 120. Various data, components, and processes of arrangement 100 may be stored on or execute on an example of computing device 1100 of FIG. 11.

Figure 3:
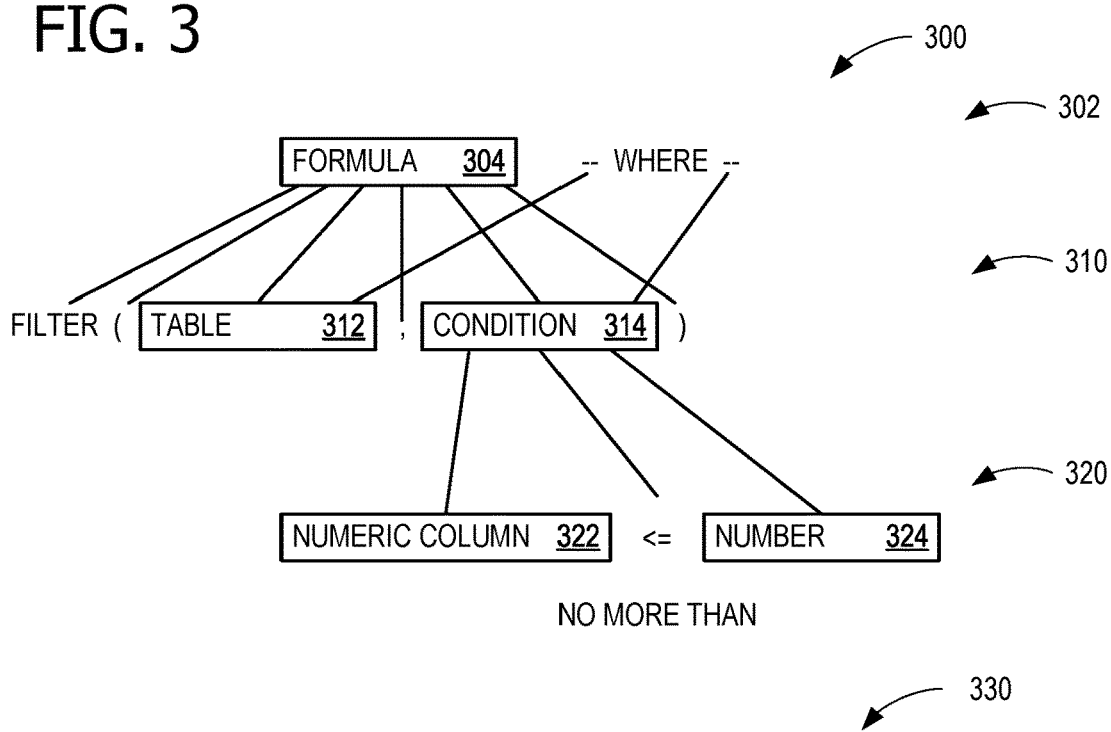
FIG. 3 illustrates an example formula tree, as may occur in the arrangement of FIG. 1.

Workflow 110 is shown with four segments: sketch sampling 112, instantiations 114, serialization 116, and repeating 118, although in some examples, repeating 118 is optional. The segment repeating 118 builds out the set of training data 120 by looping through the earlier segments of workflow 110 (e.g., sampling 112, instantiations 114, and serialization 116, iteratively) to generate a plurality of ML training data instance pairs. ML training data instance pair 122a is indicated as output from serialization 116, and comprising a formula example 124 and an NL example 126. Training data 120 is shown with four ML training data instance pairs 122a, 122b, 122c, and 122d, although it should be understood that the number may be larger in some examples (e.g., thousands, tens of thousands, or even more). Sampling 112 outputs a formula tree 300, which is described in further detail in relation to FIG. 3.

A training module 130 intakes training data 120 and trains an initially untrained ML model 132a (or further trains ML model 132a) to produce trained ML model 132. A human user 138, who is attempting to write formulas, perform calculations, or manipulate or create applications using an application 140 (such as LaTeX, Excel, Power Apps, or another application) provides NL input 134 to trained ML model 132. Trained ML model 132 generates an ML output 136, which may be a machine-interpretable formula, a database querying language command, a mathematical expression, or a general programming language instruction.

In some examples, the database querying language comprises SQL or SPARQL Protocol and Resource Description Framework (RDF) Query Language (SPARQL). In some examples, the mathematical expression comprises a LaTeX mathematical expression. In some examples, the general programming language comprises R or Python. Example uses include PowerApps users building semantic parsing tools to automatically convert NL utterances to PowerFx code and Excel users building semantic parsing tools to automatically NL utterances to Excel formulas.

While some examples are described with reference to specific database querying languages, mathematical expressions, general programming languages, and semantic parsing tools, aspects of the disclosure are not limited to these examples and are operable in other examples. Further, input is not limited to natural language utterances. For example, the input can be voice (e.g., in virtual assistants), as it is viable to use an independent module to convert the voice to natural language utterances. The output is not limited to meaning representations, but also the execution results of them.

Arrangement 100 may be advantageously employed in the construction of NL-to-formula semantic parsing systems, by automatically generating (e.g., synthesizing) a large amount of training data 120 from domain specifications 102. Arrangement 100 produces NL-to-meaning representation (MR) templates and is able to rapidly generate a large number of NL-to-MR instances based on the templates. In some examples, product managers and domain experts may write MR templates and canonical NL templates, while other users (including crowdsourcing) enrich diverse NL templates.

Example advantages include (1) the methodology continually iterates and improves performance as more and/or new patterns are added into the dataset and the ML is re-trained (e.g., trained ML model 132 moves back into the position of ML model 132a for further training); (2) components may be shared across different scenarios to enhance flexibility and start new projects in a more advanced state; and (3) privacy and compliance issues that may arise with dataset collections from live humans are precluded. Further, this approach significantly alleviates the lack of training data for semantic parsing systems, including for applications having flexible compositional formula languages, and supports complex linguistic phenomena by extending the context-free grammar. Thus, NL utterances in training data 120 may have beneficial diversity and naturalness. The data generation process is tractable and interpretable, improving confidence in the quality of training data 120.

NL utterances may be paired with their corresponding formulas in a hierarchical fashion by leveraging a hierarchical grammar organization, significantly improving the template compositionality and reusability. Some examples extend a context-free grammar approach to probabilistic context-free grammar, support partial non-context-free production rules, support grammar idioms, and more.

FIG. 2 illustrates various data used in arrangement 100. Users may provide their own formula grammar 104 and NL templates 106, which together form configuration files 200. Domain specifications 102 target the scope (e.g., domain) of the target semantic parsing. In FIG. 2, "@{Symbol-Name}@" represents the use of a non-terminal symbol. NL templates 106 includes templates for grammar rules in formula grammar 104, and context examples 108 provides a collection of application context examples.

Each of NL templates 106 comprises a format string, which may contain format string parameters. Using zero-based indexing, "@0@" means the first non-terminal symbol in the right-hand side of the corresponding production rule, "@1@" means the second non-terminal symbol in the right-hand side of the corresponding production rule, "@2@" means the third, etc. Each production rule may have several NL templates, and different production rules may share the same NL templates.

An example of ML training data instance pair 122a is shown with an exemplary formula example 124 paired with an exemplary NL example 126. Both formula example 124 and NL example 126 may take the form of a wide range of expressions, matching the rich diversity of NL. Additional examples of formula example 124 include: "Sort(BC Orders", Price, Ascending)"; "TopK(Sort(BC Orders", Price, Descending), 3)"; and "Navigate(CurrentScreen( ). Back( ))".

Formula grammar 104 describes how target formulas are hierarchically composed from individual terms. A basic framework for formula grammar is context-free grammar, for which production rules may be applied regardless of the context (as opposed to context-sensitive grammar, in which a word may, or may not be, appropriate depending on the context). In some examples, formula grammar 104 includes probabilistic context-free grammar, which extends context-free grammars. Probabilistic context-free grammar assigns a probability for each production rule. Example production rules include: "Rule 1: Formula→Filter(@Table@, @Condition@); [prob=1.0]"; "Rule 2: Condition→@NumericColumn@=@Number@; [prob=0.2]"; "Rule 3: Condition→@NumericColumn@>@Number@; [prob=0.1]".

In some examples, formula grammar 104 includes non-context-free production rules. Non-context-free production rules support partial non-projection between NL utterances and formulas, and may be implemented using numeric symbols. An example non-context-free production rule is: "Condition→(@NumericColumn@>=@Number@ And @0@<=@Number@)". This example of non-context-free production rule corresponds to NL clauses such as "price is between 10 and 20". The "@0@" symbol references the first non-terminal symbol on the right-hand side of the production rule ("@NumericColumn@"), using zero-based indexing.

In some examples, formula grammar 104 includes rule idioms. In such examples, rule idioms are supported such that a sub-formula sketch may be generated by composing some production rules, although a flatten production rule may also be written. Rule idioms are useful for increasing the naturalness and diversity of NL utterances. For example, basic rules may include "DatePrimitive→Today( )"; and "Date→DateAdd(@DatePrimitive@, @Number@, Days)", and a rule idiom may be "DatePrimitive→Date(Today( ), 1, Days)". By defining such a rule idiom, given a formula "Date(Today( ), 1, Days)", multiple compound NL utterances may be generated, such as "One day after today" (by composing the NL templates of the two basic rules), and also "tomorrow" (by directly using the NL templates of the rule idiom).

Returning to FIG. 1, further detail regarding workflow 110 is provided. Domain specifications 102 use machine-interpretable (e.g., MR) representation useable by workflow 110. Sketch sampling 112 generates a formula tree 300, shown in further detail in FIG. 3) by recursively sampling grammar rules from a root symbol in formula grammar 104) and sampling an NL template in NL templates 106. Briefly referencing FIG. 3, formula tree 300 is represented graphically as a formula sketch. In a formula tier 302 of formula tree 300, a formula 304 is expanded into a series of components, shown in formula tier 310 as a table 312 and a condition 314. Condition 314 is further expanded into a series of components, shown in formula tier 320 as a numeric column 322 and a number, with a relation, illustrated as "no more than" or "less than or equal to".

A pre-order traversal on this example formula tree 300 produces a flattened sketch 330 as shown, where "@0@" refers to the first non-terminal symbol in the flatten formula sketch (e.g., "@Table@"), and "@1@" refers to the second non-terminal symbol (e.g., "@NumericColumn@"), using zero-based indexing. Instantiation 114 instantiates special leaf nodes in formula tree 300 by sampling from sampling context examples 108. Using the example of training data instance pair 122a from FIG. 2, instantiation 114 translates "@Table@" as the "BC Orders" table and "@NumericColumn@" as the "Price" column.

In some examples, the sampling is probabilistic. For each non-terminal symbol ("@{name}@"), MR-NL pair is recursively sampled from this symbol and the symbol is replaced with the sampled sub-MR element. After the non-terminal symbols are replaced, the MR is obtained. For each reference symbol ("@{k}@", where k is an integer) in the NL pattern, the $k^{th}$ non-terminal symbol is found, and the reference symbol in the ML pattern is replaced with the corresponding sub-NL. After all reference symbols are replaced, the NL example is obtained. The MR and NL results are returned as formula example 124 and NL example 126, respectively.

Figure 4:
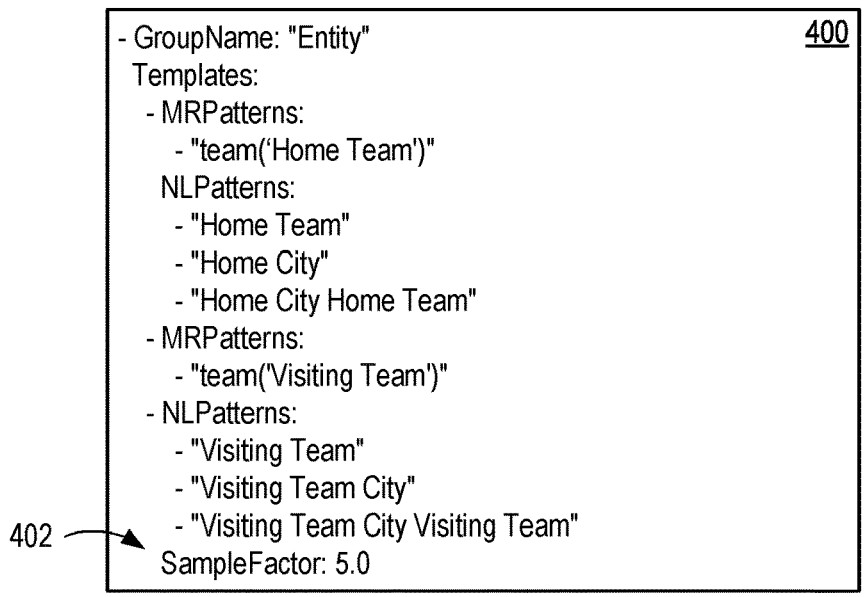
FIG. 4 illustrates an example input, which adjusts a probability of sampling, as may occur in the arrangement of FIG. 1.

In some examples, the probabilistic sampling may be adjusted to increase the likelihood of one sample relative to others. FIG. 4 illustrates example NL templates 400, which is an example of NL templates 106 that has a sample factor 402 stating "SampleFactor: 5.0". This makes "Visiting Team City Visiting Team" occur more often than "Home City Home Team". When sampling a template from the Entity group, the probability of the Visiting Team template is:

$$\frac{5.0}{1.0+5.0}.$$

In other words, for each template x in group g:

$$P(x) = \frac{x.\text{sample\_factor}}{\sum_{t \in g} t.\text{sample\_factor}} = \frac{5.0}{1.0+5.0} \qquad \text{Eq (1)}$$

where P(x) is the adjusted probability. The default value of SampleFactor, when not specified, is 1.0. Additionally, a SampleFactor may also assigned to a NL patterns, groups, and MR patterns.

Each of NL templates 106 comprises a format string, which may contain format string parameters. Using zero-based indexing, "@0@" means the first non-terminal symbol in the right-hand side of the corresponding production rule, "@1@" means the second non-terminal symbol in the right-hand side of the corresponding production rule, "@2@" means the third, etc. Each production rule may have several NL templates, and different production rules may share the same NL templates.

Figure 5:
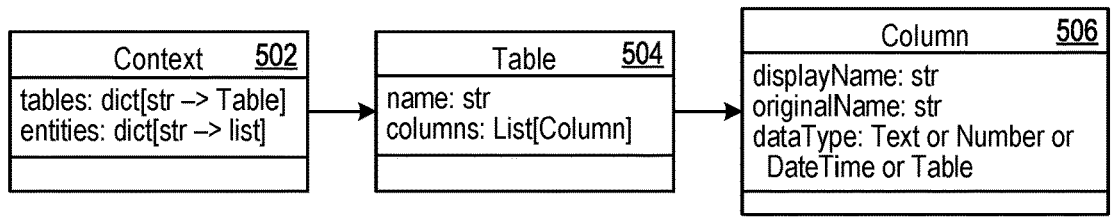
FIG. 5 illustrates a graphical view of a solution model for instantiating a formula tree, as may occur in the arrangement of FIG. 1.

In some examples, context examples 108 are used by instantiation 114 to instantiate special leaf nodes in the formula sketch, as indicated in FIG. 5. A particular context 502 is combined with a table 504 and a column 506 in FIG. 5. In general, each Context represents all entities that may be referred in the natural language utterance. For example, a context may contain several data tables and user-defined controls (e.g., buttons, galleries, and text inputs). Each Context object has two properties, in some examples: (1) tables: a collection of tables; (2) entities: a dictionary that stores entities other than tables.

The keys in entities are distinct names of different entity types, for example, "Button", "Gallery", and "TextInput". Each entity type corresponds to a list, which contains all entities of the type. These entities can be represented by any class that has the Name property.

Following the definition of relational database management systems (RDBMS), each Table has a name (e.g., "BC Orders") and a list of columns (tables are just like concepts in the user-defined data, and columns are like attributes of these concepts). In some examples, each Column has a displayName, an originalName, and a datatype. The originalName is a unique, immutable, concise, no-spaces name for the column, e.g., "T_x002d_shirt_x0020_size". These restrictions are common across computer systems helping them to interoperate and are more concise and easier to work with for developers. Another example property, display-Names, is more human friendly and can contain spaces and punctuation (e.g., "T Shirt Size").

The dataType property of Column can be Text, Number, DateTime, or a Table. For example: Text columns such as "Full Name", "Address", and "Email"; Number columns such as "Price", "Age", and "Height"; DateTime columns such as "Year", "Create On", and "Registered Date". If dataType is a Table, this column is a LookUp column, which means that contents of this column are references to records in that table. For example, in table "BC Orders", the dataType of column "Owner" is table "Account".

Figure 6:
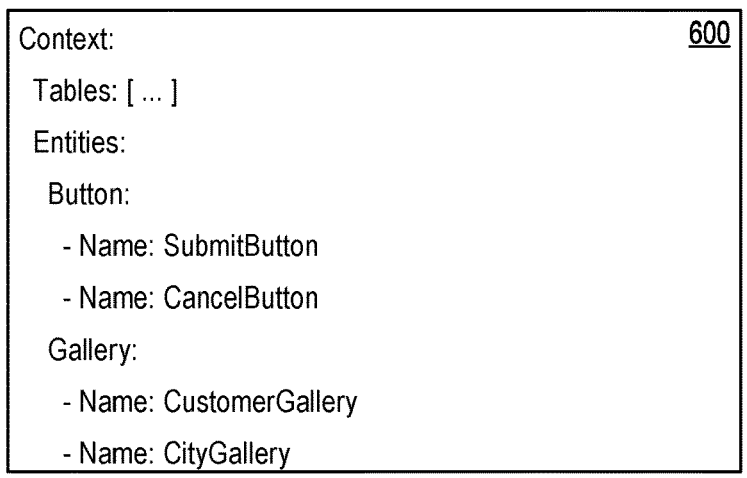
FIG. 6 illustrates a context example, as may be used in the arrangement of FIG. 1.

FIG. 6 illustrates an exemplary context example 600, as may be found in context examples 108, in which application context is represented using an "entities" property rather than as a table. The property is a mapping: the keys are the names of specific context types, and the values are the object lists of those types. For example, in some software applications ("apps"), context includes not only data tables, but also canvas app controls such as text inputs, buttons, galleries, date pickers, combo boxes, and so on. In such a scenario, the user is able to specify that an application context example has the entities. In some examples, the context model is extended by adding custom properties to a table or column (e.g., table 504 or column 506 of FIG. 5).

Figure 7:
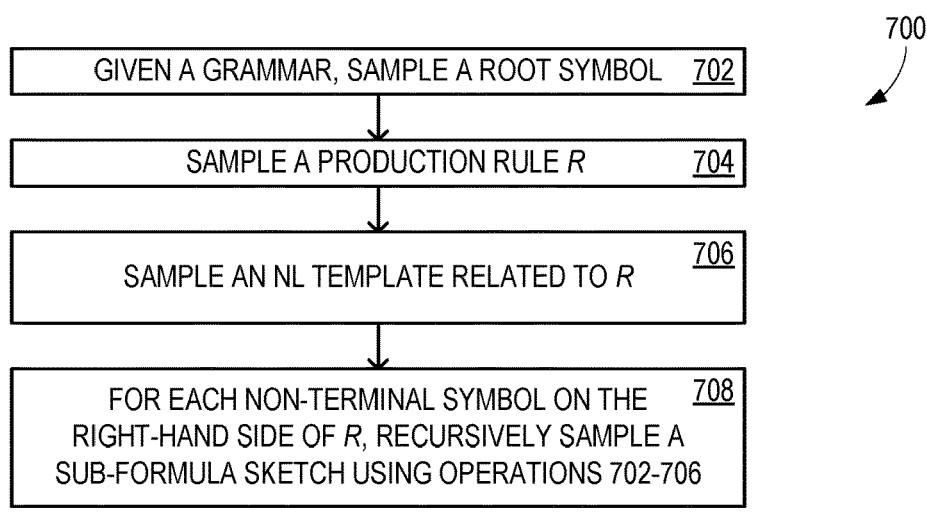
FIG. 7 illustrates an example implementation of sketch sampling, as may occur in the arrangement of FIG. 1.

An example implementation of sketch sampling is illustrated in FIG. 7 as flowchart 700. Operation 702 includes, given a grammar, sample a root symbol S from the grammar. Operation 704 samples a production rule R from the production rules with the left-hand side symbol=S. Operation 706 samples an NL template T from NL templates 106 that is related to R. Operation 708 recursively samples a subformula sketch using operations 702-706 for each non-terminal symbol on the right-hand side of R. In some examples, if a user specifies formula grammar 104 as a probabilistic grammar, operation 704 samples the production rule based on the specified probabilities. Similarly, if the user assigned probabilities to NL templates 106, operation 706 samples the NL templates based on the specified probabilities.

Serialization 116 serializes the instantiated formula tree 300 (instantiated as thus described) into a formula paired with its corresponding ML-generated utterance to provide a single instance of training data 120 (e.g., a single ML training data instance pair).

Figure 8A:
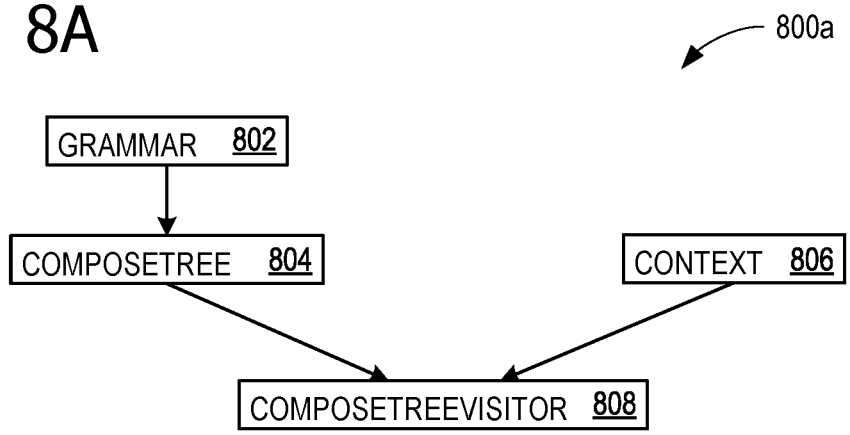
FIG. 8A illustrates a graphical view of instantiation, as may occur in the arrangement of FIG. 1.

FIG. 8A illustrates a graphical view 800 of instantiation, as may occur in arrangement 100. Sampling a formula tree 300 from a grammar 802 produces a ComposeTree 804. Using a Context 806 (e.g., from context examples 108) produces a ComposeTreeVisitor 808.

Figure 8B:
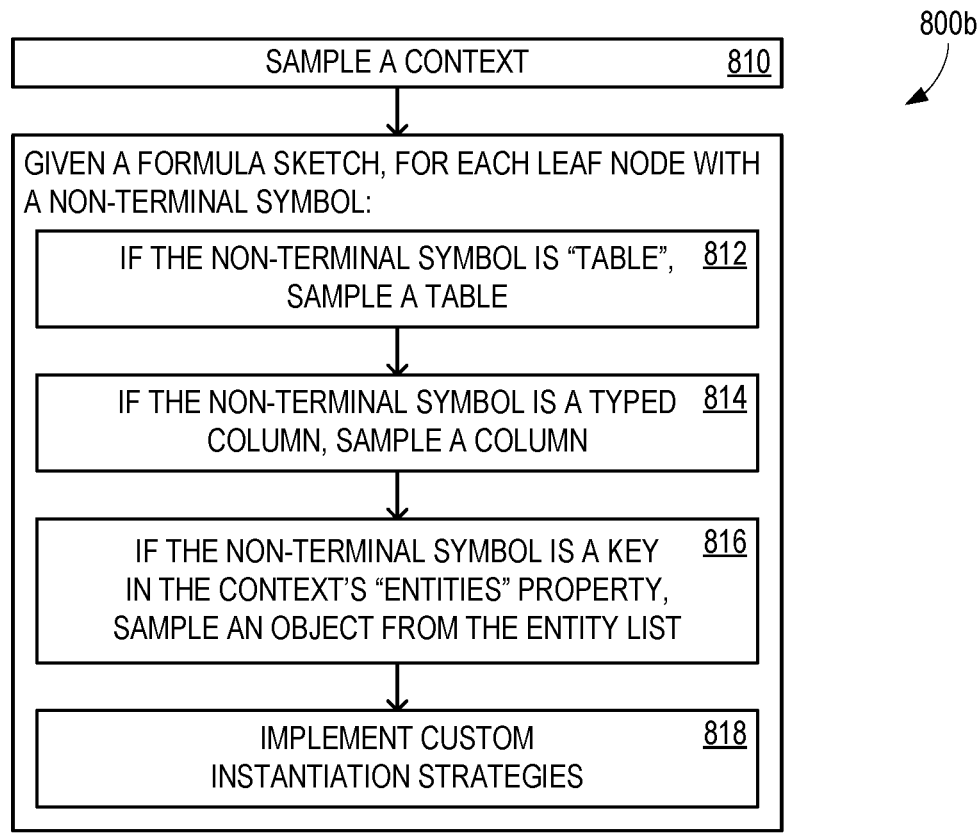
FIG. 8B illustrates an example implementation of instantiation, as may occur in the arrangement of FIG. 1.

An example implementation of instantiation is illustrated in FIG. 8B as flowchart 800b. Operation 810 samples a context from context examples 108. Operation 812-818 are performed for each leaf node with a non-terminal symbol (in preorder traversal), for a given a formula tree 300. If the non-terminal symbol is "Table", operation 812 instantiates the node by sampling a table from context examples 108. If the non-terminal symbol is a typed column, e.g., "NumericColumn" or "StringColumn", operation 814 instantiates the node by sampling a column of the specified type from the table. In some examples, the table is resolved by a rule-based algorithm.

If the non-terminal symbol is a key in the context's "entities" property, operation 816 instantiates the node by sampling an object from the entity list. Some examples have custom built-in instantiation strategies, for example, instantiating each node with a number symbol by sampling a number. If the node is not instantiated in one of operations 812-818, it is not instantiated. The final stage of workflow 110 (repeating 118) generates additional data instances to build out training data 120 (e.g., iteratively).

In some examples, trained ML model 132 (a semantic parsing model) has an encoder, which encodes NL input q into a vector representation, and a decoder which learns to generate a conditioned on the encoding vector. Both the encoder and the decoder may be neural network (NN) modules, which use multiple learnable model parameters. During the model training process, for each data instance (q', a'), the goal of the optimization process is to maximize p(a'|q').

Training module 130 uses training data 120 to train ML model 132a for semantic parsing. This process trains ML model 132a to map natural language input represented in Eq. (2) to a logic form representation of its meaning represented in Eq. (3).

$$q = x_1, x_2, \ldots, x_{|q|} \qquad \text{Eq(2)}$$

$$a = y_1, y_2, \ldots, y_{|a|} \qquad \text{Eq(3)}$$

The conditional probability p(a|q) is decomposed as:

$$p(a|q) = \Pi_{t=1}^{|a|} p(y_t | y_{<t}, q) \qquad \text{Eq(4)}$$

where $$y_{<t} = y_1, y_2, \ldots, y_{|t-1|} \qquad \text{Eq(5)}$$

Figure 9:
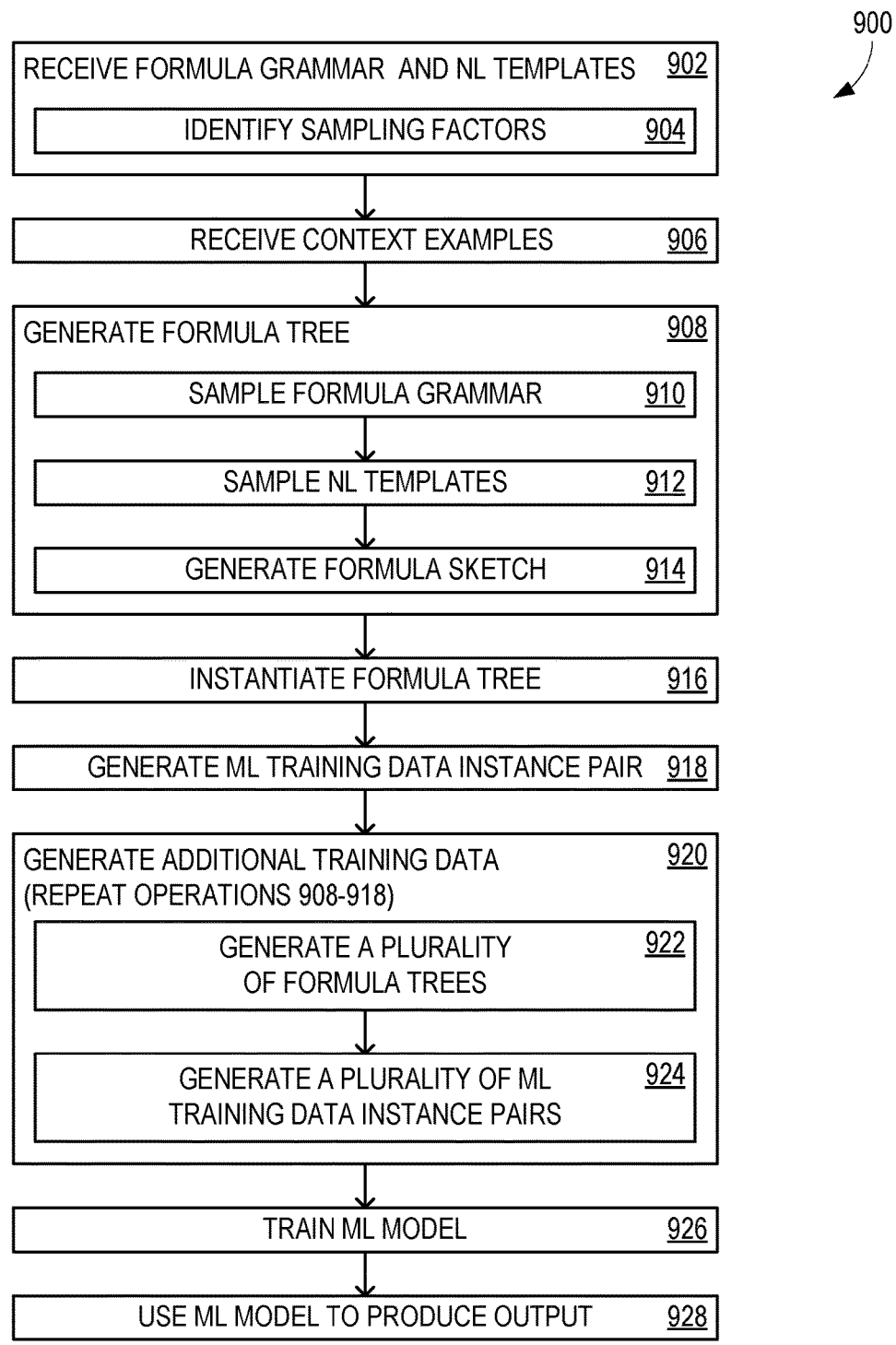
FIG. 9 is a flowchart illustrating exemplary operations that may be performed by the arrangement of FIG. 1.

FIG. 9 is a flowchart 900 illustrating exemplary operations that may performed by arrangement 100. In some examples, operations described for flowchart 900 are performed by computing device 1100 of FIG. 11. Domain specifications 102 are received in operations 902-906. Operation 902 includes receiving formula grammar 104 and NL templates 106. In some examples, formula grammar 104 includes probabilistic context-free grammar. In some examples, formula grammar 104 includes non-context-free production rules. In some examples, as part of operation 902, operation 904 includes identifying sampling factor 402 to adjust a probability of sampling. Operation 906 includes receiving context examples 108.

Formula tree 300 is generated in operation 908, which includes operations 910-914. Operation 910 includes sampling formula grammar 104. In some examples, sampling formula grammar 104 comprises probabilistically sampling formula grammar 104. Operation 912 includes sampling NL templates 106. In some examples, sampling NL templates 106 comprises probabilistically sampling NL templates 106. In some examples, operation 914 includes generating a formula sketch. Operation 916 includes instantiating formula tree 300. In some examples, instantiating formula tree 300 comprises sampling context examples 108. In some examples, sampling context examples 108 comprises probabilistically sampling context examples 108.

Operation 918 includes using formula tree 300, generating ML training data instance pair 122a comprising formula example 124 and NL example 126. Additional training data 120 is generated in operation 920, which is performed by repeating looping through operations 908-918 (e.g., iteratively). For simplicity of presentation however, this is represented as operations 922 and 924. Operation 922 includes repeating sampling formula grammar 104 and sampling NL templates 106 to generate a plurality of formula trees 300 (e.g., repeating operations 908-916, iteratively). Operation 924 includes using the plurality of formula trees 300, generating a plurality of training data instance pairs 122a-122d, each training data instance pair 122a-122d comprising a formula example and an NL example (e.g., formula example 124 and NL example 126).

Operation 926 includes training ML model 132a with training data 120, comprising ML training data instance pair 122a, to produce trained ML model 132. Operation 928 includes generating, with trained ML model 132, using NL input 134, ML output 136. In some examples, ML output 136 comprises a machine-interpretable formula. In some examples, ML output 136 comprises at least one item selected from the list consisting of a database querying language command, a mathematical expression, and a general programming language instruction. In some examples, the database querying language comprises SQL or SPARQL. In some examples, the mathematical expression comprises a LaTeX mathematical expression. In some examples, the general programming language comprises R or Python.

Figure 10:
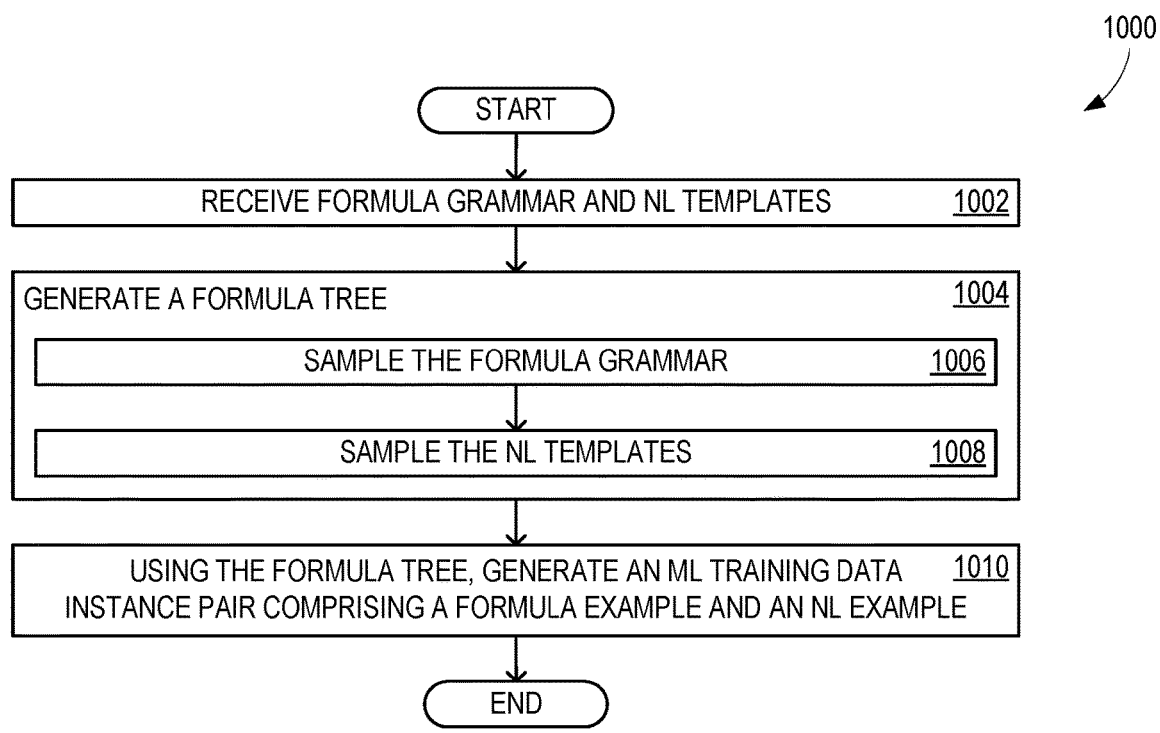
FIG. 10 is another flowchart illustrating exemplary operations that may be performed by the arrangement of FIG. 1.

FIG. 10 is a flowchart 1000 illustrating exemplary operations associated with arrangement 100. In some examples, operations described for flowchart 1000 are performed by computing device 1100 of FIG. 11. Flowchart 1000 commences with operation 1002, which includes receiving formula grammar and NL templates. Operation 1004 includes generating a formula tree, which comprises operations 1006 and 1008. Operation 1006 includes sampling the formula grammar. Operation 1008 includes sampling the NL templates. Operation 1010 includes, using the formula tree, generating an ML training data instance pair comprising a formula example and an NL example.

Additional Examples

Some examples contemplate sampling with look up. In such examples, the disclosure samples from not only all string columns in a current table, but also all lookup columns in it. If a lookup column is selected, the disclosure samples a string column from its target table. A similar mechanism is available for other groups of columns, such as number column with data column.

In some examples, diverse descriptions may be generated using syntax-directed translation. For example, for each production rule in a grammar, several description patterns can be generated. For each generated formal expression, the descriptions can be randomly sampled (e.g., uniform distribution).

An example method of ML for NL processing comprises: receiving formula grammar and NL templates; generating a formula tree, wherein generating the formula tree comprises: sampling the formula grammar; and sampling the NL templates; and using the formula tree, generating an ML training data instance pair comprising a formula example and an NL example.

An example system for performing ML for NL processing comprises: a processor; and a computer-readable medium storing instructions that are operative upon execution by the processor to: receive formula grammar and NL templates; generate a formula tree, wherein generating the formula tree comprises: sampling the formula grammar; and sampling the NL templates; and using the formula tree, generate an ML training data instance pair comprising a formula example and an NL example.

One or more example computer storage devices has computer-executable instructions stored thereon, which, on execution by a computer, cause the computer to perform operations comprising: receiving formula grammar and NL templates; generating a formula tree, wherein generating the formula tree comprises: sampling the formula grammar; and sampling the NL templates; and using the formula tree, generating an ML training data instance pair comprising a formula example and an NL example.

Alternatively, or in addition to the other examples described herein, examples include any combination of the following:
  raining an ML model with training data, comprising the ML training data instance pair, to produce a trained ML model;
  generating, with the trained ML model, using NL input, an ML output;
  the ML output comprises a machine-interpretable formula;
  generating the formula tree further comprises generating a formula sketch;
  receiving context examples;
  instantiating the formula tree;
  instantiating the formula tree comprises sampling the context examples;
  repeating sampling the formula grammar and sampling the NL templates to generate a plurality of formula trees;
  using the plurality of formula trees, generating a plurality of training data instance pairs;
  each training data instance pair comprises a formula example and an NL example;
  sampling the formula grammar comprises probabilistically sampling the formula grammar;
  sampling the NL templates comprises probabilistically sampling the NL templates;
  sampling the context examples comprises probabilistically sampling the context examples;
  identifying a sampling factor to adjust a probability of sampling;
  the ML output comprises at least one item selected from the list consisting of a database querying language command, a mathematical expression, and a general programming language instruction;
  the database querying language comprises SQL;
  the database querying language comprises SPARQL;
  the mathematical expression comprises a LaTeX mathematical expression;
  the general programming language comprises R; and
  the general programming language comprises Python.

While the aspects of the disclosure have been described in terms of various examples with their associated operations, a person skilled in the art would appreciate that a combination of operations from any number of different examples is also within scope of the aspects of the disclosure.

Example Operating Environment

Figure 11:
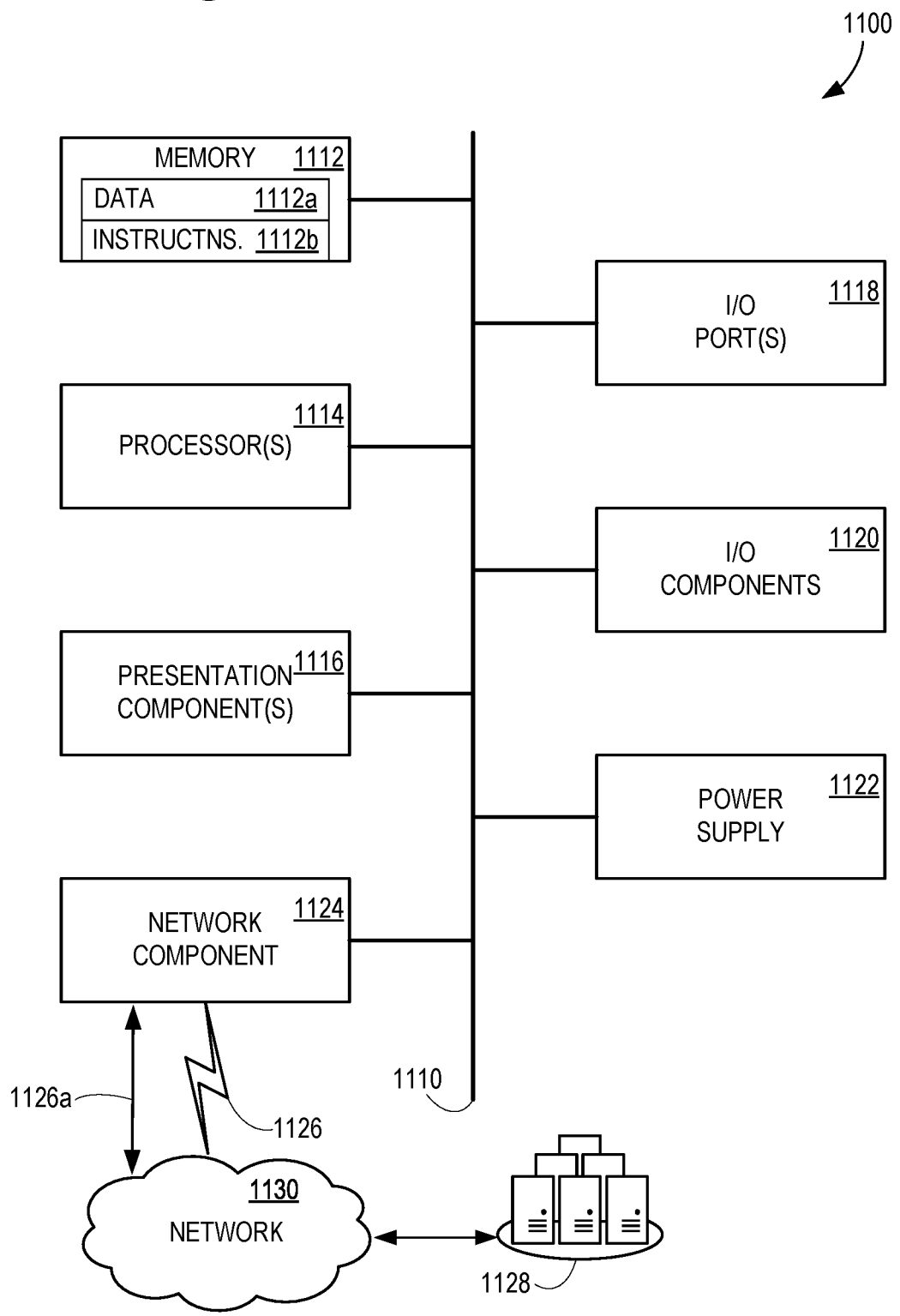
FIG. 11 is a block diagram of an example computing environment suitable for implementing some of the various examples disclosed herein.

FIG. 11 is a block diagram of an example computing device 1100 for implementing aspects disclosed herein, and is designated generally as computing device 1100. In some examples, one or more computing devices 1100 are provided for an on-premises computing solution. In some examples, one or more computing devices 1100 are provided as a cloud computing solution. In some examples, a combination of on-premises and cloud computing solutions are used. Computing device 1100 is but one example of a suitable computing environment and is not intended to suggest any limitation as to the scope of use or functionality of the examples disclosed herein, whether used singly or as part of a larger set.

Neither should computing device 1100 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1100 includes a bus 1110 that directly or indirectly couples the following devices: computer storage memory 1112, one or more processors 1114, one or more presentation components 1116, input/output (I/O) ports 1118, I/O components 1120, a power supply 1122, and a network component 1124. While computing device 1100 is depicted as a seemingly single device, multiple computing devices 1100 may work together and share the depicted device resources. For example, memory 1112 may be distributed across multiple devices, and processor(s) 1114 may be housed with different devices.

Bus 1110 represents what may be one or more busses (such as an address bus, data bus, or a combination thereof). Although the various blocks of FIG. 11 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 11 and the references herein to a "computing device." Memory 1112 may take the form of the computer storage media referenced below and operatively provide storage of computer-readable instructions, data structures, program modules and other data for the computing device 1100. In some examples, memory 1112 stores one or more of an operating system, a universal application platform, or other program modules and program data. Memory 1112 is thus able to store and access data 1112a and instructions 1112b that are executable by processor 1114 and configured to carry out the various operations disclosed herein.

In some examples, memory 1112 includes computer storage media. Memory 1112 may include any quantity of memory associated with or accessible by the computing device 1100. Memory 1112 may be internal to the computing device 1100 (as shown in FIG. 11), external to the computing device 1100 (not shown), or both (not shown). Additionally, or alternatively, the memory 1112 may be distributed across multiple computing devices 1100, for example, in a virtualized environment in which instruction processing is carried out on multiple computing devices 1100. For the purposes of this disclosure, "computer storage media," "computer-storage memory," "memory," and "memory devices" are synonymous terms for the computer-storage memory 1112, and none of these terms include carrier waves or propagating signaling.

Processor(s) 1114 may include any quantity of processing units that read data from various entities, such as memory 1112 or I/O components 1120. Specifically, processor(s) 1114 are programmed to execute computer-executable instructions for implementing aspects of the disclosure. The instructions may be performed by the processor, by multiple processors within the computing device 1100, or by a processor external to the client computing device 1100. In some examples, the processor(s) 1114 are programmed to execute instructions such as those illustrated in the flow charts discussed below and depicted in the accompanying drawings. Moreover, in some examples, the processor(s) 1114 represent an implementation of analog techniques to perform the operations described herein. For example, the operations may be performed by an analog client computing device 1100 and/or a digital client computing device 1100. Presentation component(s) 1116 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1100, across a wired connection, or in other ways. I/O ports 1118 allow computing device 1100 to be logically coupled to other devices including I/O components 1120, some of which may be built in. Example I/O components 1120 include, for example but without limitation, a microphone, joystick, game pad, satellite dish, scanner, printer, wireless device, etc.

The computing device 1100 may operate in a networked environment via the network component 1124 using logical connections to one or more remote computers. In some examples, the network component 1124 includes a network interface card and/or computer-executable instructions (e.g., a driver) for operating the network interface card. Communication between the computing device 1100 and other devices may occur using any protocol or mechanism over any wired or wireless connection. In some examples, network component 1124 is operable to communicate data over public, private, or hybrid (public and private) using a transfer protocol, between devices wirelessly using short range communication technologies (e.g., near-field communication (NFC), Bluetooth branded communications, or the like), or a combination thereof. Network component 1124 communicates over wireless communication link 1126 and/or a wired communication link 1126a to a cloud resource 1128 across network 1130. Various different examples of communication links 1126 and 1126a include a wireless connection, a wired connection, and/or a dedicated link, and in some examples, at least a portion is routed through the internet.

Although described in connection with an example computing device 1100, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   a processor; and
   a computer-readable medium storing instructions that are operative upon execution by the processor to:
   receive a formula grammar and natural language (NL) templates;
   generate a formula tree, wherein generating the formula tree comprises generating at least one of a flattened NL sketch or a flattened formula sketch, and wherein generating the formula tree comprises sampling the formula grammar and sampling the NL templates;
   using the formula tree, generate a machine learning (ML) training data instance pair that associates an NL example utterance with a formula converting the NL example utterance into a machine-interpretable representation or meaning representation;
   receive an NL input from a user accessing an application;
   generate an ML output from the NL input using an ML model trained with the ML training data instance pair; and
   send the ML output to the application being accessed by the user.

2. The system of claim 1, wherein the ML output comprises a machine-interpretable formula.

3. The system of claim 1, wherein generating the formula tree further comprises generating a formula sketch.

4. The system of claim 1, wherein the instructions are further operative to:
   receive context examples; and
   instantiate the formula tree, wherein instantiating the formula tree comprises sampling the context examples.

5. The system of claim 1, wherein the instructions are further operative to:
   repeat sampling the formula grammar and sampling the NL templates to generate a plurality of formula trees; and
   using the plurality of formula trees, generate a plurality of training data instance pairs, each training data instance pair comprising a formula example and an NL example.

6. The system of claim 1, wherein the formula grammar includes probabilistic context-free grammar.

7. The system of claim 1, wherein the formula grammar includes non-context-free production rules.

8. A computerized method comprising:
   receiving a formula grammar and natural language (NL) templates;
   generating a formula tree, wherein generating the formula tree comprises sampling the formula grammar and sampling the NL templates and wherein at least one of sampling the formula grammar or sampling the NL templates comprises identifying a sampling factor that increases a likelihood of a first sample occurring more often than a second sample;
   using the formula tree, generating a machine learning (ML) training data instance pair that associates an NL example utterance with a formula converting the NL example utterance into a machine-interpretable representation or meaning representation;
   receiving an NL input from a user accessing an application;
   generating an ML output from the NL input using an ML model trained with the ML training data instance pair; and sending the ML output to the application being accessed by the user.

9. The computerized method of claim 8, wherein the ML output comprises a machine-interpretable formula.

10. The computerized method of claim 8, wherein generating the formula tree further comprises generating a formula sketch.

11. The computerized method of claim 8, further comprising:
receiving context examples; and
instantiating the formula tree, wherein instantiating the formula tree comprises sampling the context examples.

12. The computerized method of claim 8, further comprising:
repeating sampling the formula grammar and sampling the NL templates to generate a plurality of formula trees; and
using the plurality of formula trees, generating a plurality of training data instance pairs, each training data instance pair comprising a formula example and an NL example.

13. The computerized method of claim 8, wherein the formula grammar includes probabilistic context-free grammar.

14. The computerized method of claim 8, wherein the formula grammar includes non-context-free production rules.

15. One or more computer storage devices having computer-executable instructions stored thereon, which, on execution by a computer, cause the computer to perform operations comprising:
receiving a formula grammar and natural language (NL) templates;
generating a formula tree, wherein generating the formula tree comprises generating at least one of a flattened NL sketch or a flattened formula sketch, and wherein generating the formula tree comprises sampling the formula grammar and sampling the NL templates;
using the formula tree, generating a machine learning (ML) training data instance pair that associates an NL example utterance with a formula converting the NL example utterance into a machine-interpretable representation or meaning representation;
receiving an NL input from a user accessing an application;
generating an ML output from the NL input using an ML model trained with the ML training data instance pair; and
sending the ML output to the application being accessed by the user.

16. The one or more computer storage devices of claim 15, wherein the ML output comprises a machine-interpretable formula.

17. The one or more computer storage devices of claim 15, wherein the operations further comprise:
receiving context examples; and
instantiating the formula tree, wherein instantiating the formula tree comprises sampling the context examples.

18. The one or more computer storage devices of claim 15, wherein the operations further comprise:
repeating sampling the formula grammar and sampling the NL templates to generate a plurality of formula trees; and
using the plurality of formula trees, generating a plurality of training data instance pairs, each training data instance pair comprising a formula example and an NL example.

19. The one or more computer storage devices of claim 15, wherein the formula grammar includes probabilistic context-free grammar.

20. The one or more computer storage devices of claim 15, wherein the formula grammar includes non-context-free production rules.

* * * * *